(12) United States Patent
Sadana

(10) Patent No.: US 8,737,930 B2
(45) Date of Patent: May 27, 2014

(54) HANDHELD APPARATUS AND METHOD FOR DETERMINING THE RELIABILITY OF A NETWORK CONNECTION AT A SITE

(75) Inventor: Rajat Sadana, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 699 days.

(21) Appl. No.: 12/545,499

(22) Filed: Aug. 21, 2009

(65) Prior Publication Data

US 2010/0062735 A1 Mar. 11, 2010

Related U.S. Application Data

(60) Provisional application No. 61/094,773, filed on Sep. 5, 2008.

(51) Int. Cl.
*H04B 17/00* (2006.01)
(52) U.S. Cl.
USPC .......................................................... 455/67.7
(58) Field of Classification Search
CPC .................................................... H04W 28/24
USPC .......................................... 455/67.7; 370/252
See application file for complete search history.

(56) References Cited

U.S. PATENT DOCUMENTS

| | | | |
|---|---|---|---|
| 6,499,006 B1 | 12/2002 | Rappaport et al. | |
| 6,721,557 B1* | 4/2004 | Ritter | 455/423 |
| 6,799,016 B2 | 9/2004 | Davis et al. | |
| 7,246,045 B1 | 7/2007 | Rappaport et al. | |
| 7,471,956 B2* | 12/2008 | Byford et al. | 455/456.6 |
| 7,725,122 B1 | 5/2010 | Balakrishnan et al. | |
| 2002/0099854 A1* | 7/2002 | Jorgensen | 709/249 |
| 2004/0259555 A1 | 12/2004 | Rappaport et al. | |
| 2005/0002375 A1* | 1/2005 | Gokhale et al. | 370/347 |
| 2005/0254435 A1* | 11/2005 | Moakley et al. | 370/252 |
| 2006/0242282 A1* | 10/2006 | Mullarkey | 709/223 |
| 2009/0006010 A1 | 1/2009 | Van Sloun et al. | |

OTHER PUBLICATIONS

"Connect802", Network Orange, http://www.netorange.com/products/connect802/suite_spot_survey/tt_connect802_survey.html, 2008, 3 pages.
David R. Kaufman, et al., "Virtual Wireless Communication Industrial Site Survey", U.S. Appl. No. 12/106,606, filed Apr. 21, 2008.

* cited by examiner

*Primary Examiner* — David Bilodeau

(57) ABSTRACT

A method includes receiving wireless signals from a wireless network at a handheld device located at a specified site. The wireless signals are associated with a network connection at the specified site. The method also includes determining one or more metrics related to a reliability of the network connection at the specified site. In addition, the method includes determining that a class of application or device is supported by the network connection using the one or more metrics. The one or more metrics could include signal strength, bandwidth, latency, average number of channels available, number of routing elements visible, and/or average latency. Determining that the class of application or device is supported by the network connection could include determining that each of the one or more metrics is suitable for the class of application or device based on a criticality of the class of application or device.

23 Claims, 4 Drawing Sheets

HANDHELD APPARATUS AND METHOD FOR DETERMINING THE RELIABILITY OF A NETWORK CONNECTION AT A SITE

CROSS-REFERENCE TO RELATED APPLICATIONS

This application claims priority under 35 U.S.C. §119(e) to U.S. Provisional Patent Application No. 61/094,773 filed on Sep. 5, 2008, which is hereby incorporated by reference.

TECHNICAL FIELD

This disclosure relates generally to wireless networks and more specifically to a handheld apparatus and method for determining the reliability of a network connection at a site.

BACKGROUND

A business wanting to deploy a new application or device at a particular site often must first determine if the reliability of a network connection at the site is suitable for linking the new application or device to a network. A full-blown site survey can be used to measure the reliability of the network connection, but it is a costly and time-consuming process. Although the time and expense may be justified when a large number of applications or devices are to be added, it is difficult to justify the time and expense for the addition of one or a few applications or devices.

SUMMARY

This disclosure provides a handheld apparatus and method for determining the reliability of a network connection at a site.

In a first embodiment, a method includes receiving wireless signals from a wireless network at a handheld device located at a specified site. The wireless signals are associated with a network connection at the specified site. The method also includes determining one or more metrics related to a reliability of the network connection at the specified site. In addition, the method includes determining that a class of application or device is supported by the network connection using the one or more metrics.

In a second embodiment, a handheld device includes a receiver configured to receive wireless signals at a specified site from a wireless network. The wireless signals are associated with a network connection at the specified site. The handheld device also includes a controller configured to determine one or more metrics related to a reliability of the network connection at the specified site and to determine that a class of application or device is supported by the network connection using the one or more metrics. The handheld device further includes a display configured to present information indicating that the class of application or device is supported by the network connection at the specified site.

In a third embodiment, a handheld device includes a receiver configured to receive wireless signals at a specified site from a wireless network. The wireless signals are associated with a network connection at the specified site. The handheld device also includes a controller configured to determine one or more metrics related to a reliability of the network connection at the specified site. The handheld device further includes an interface configured to provide the one or more metrics to an external device and to receive an indication that a class of application or device is supported by the network connection from the external device. In addition, the handheld device includes a display configured to present information indicating that the class of application or device is supported by the network connection at the specified site.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
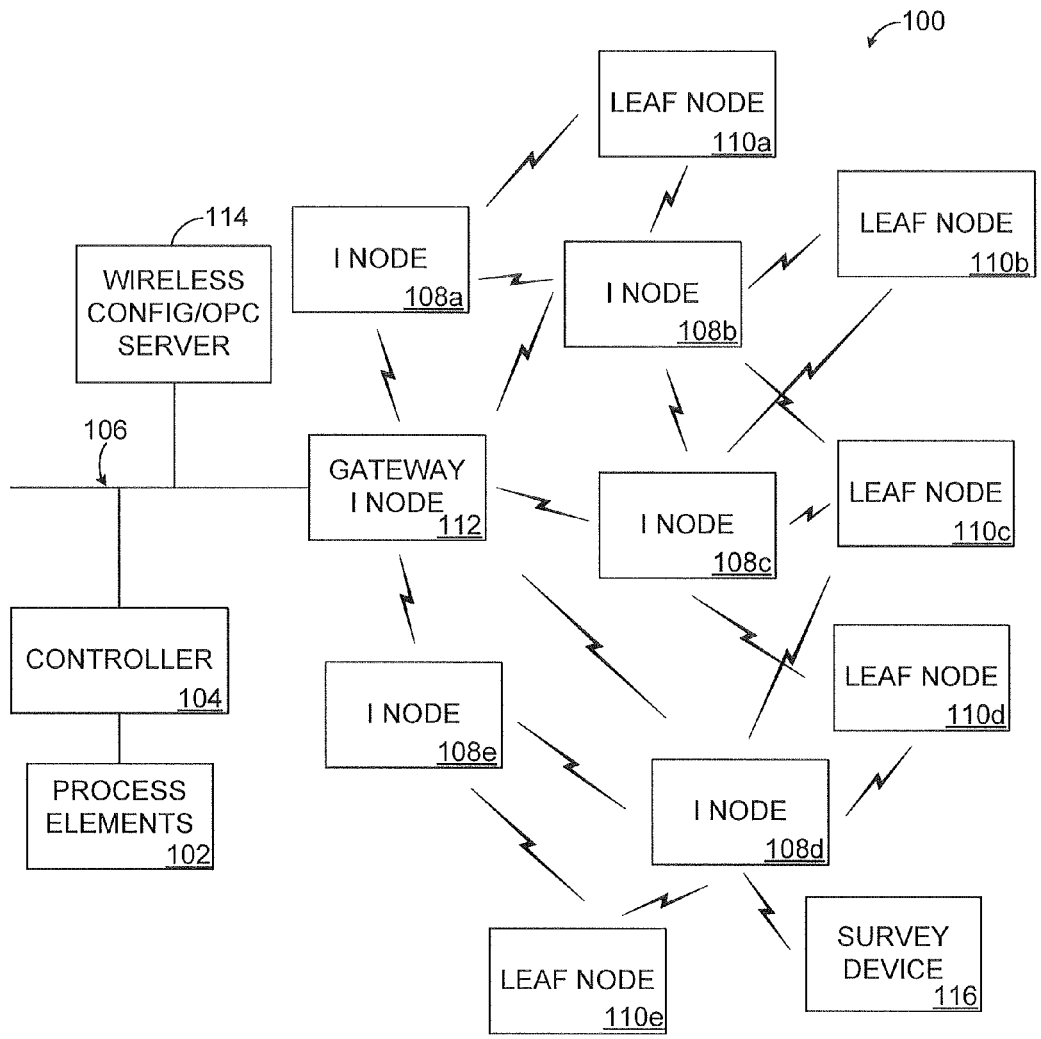
FIG. 1 illustrates an example wireless network system according to this disclosure.

FIG. 1 illustrates an example wireless network system 100 according to this disclosure. The embodiment of the system 100 shown in FIG. 1 is for illustration only. Other embodiments of the system 100 could be used without departing from the scope of this disclosure.

In this example embodiment, the system 100 includes one or more process elements 102. The process elements 102 represent components in a process system that perform any of a wide variety of functions. For example, the elements 102 could represent sensors, actuators, or any other or additional industrial equipment in a processing environment. Each process element 102 includes any suitable structure for performing one or more functions in a process system. Also, a process system may represent any system or portion thereof configured to process one or more materials in some manner.

A controller 104 is coupled to the process elements 102. The controller 104 controls the operation of one or more of the process elements 102. For example, the controller 104 could receive information associated with a system, such as sensor measurements from some of the process elements 102. The controller 104 could use this information to provide control signals to others of the process elements 102, thereby adjusting the operation of those process elements 102. The controller 104 includes any hardware, software, firmware, or combination thereof for controlling one or more process elements 102. The controller 104 could, for example, represent a computing device executing a MICROSOFT WINDOWS® operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks (WANs), all or a portion of a global network, or any other communication system or systems at one or more locations. In some embodiments, the network 106 could represent multiple networks, such as a pair of Ethernet networks or a FAULT TOLERANT ETHERNET (FTE) network from HONEYWELL INTERNATIONAL INC. (which includes a redundant pair of Ethernet networks).

In FIG. 1, the system 100 also includes one or more wireless networks for communicating with wireless sensors or other devices. In this example, a wireless network includes infrastructure nodes ("I nodes") 108a-108e, leaf nodes 110a-110e, and a gateway infrastructure node 112.

The infrastructure nodes 108a-108e and the leaf nodes 110a-110e engage in wireless communications with each other. For example, the infrastructure nodes 108a-108e may receive data transmitted over the network 106 (via the gateway infrastructure node 112) and wirelessly communicate the data to the leaf nodes 110a-110e. Similarly, the leaf nodes 110a-110e may wirelessly communicate data to the infrastructure nodes 108a-108e for forwarding to the network 106 (via the gateway infrastructure node 112). In addition, the infrastructure nodes 108a-108e may wirelessly exchange data with one another. In this way, the infrastructure nodes 108a-108e, 112 form a wireless network capable of providing wireless coverage to leaf nodes and other devices in a particular site.

In this example, the nodes 108a-108e and 110a-110e are divided into infrastructure nodes and leaf nodes. The infrastructure nodes 108a-108e typically represent access point/routing devices that can store and forward messages for other devices. Infrastructure nodes 108a-108e are typically line-powered, meaning these nodes receive operating power from an external source. Infrastructure nodes 108a-108e are typically not limited in their operations since they need not minimize power consumption to increase the operational life of their internal power supplies. On the other hand, the leaf nodes 110a-110e are generally non-routing devices that do not store and forward messages for other devices. Leaf nodes 110a-110e typically represent devices powered by local power supplies, such as nodes that receive operating power from internal batteries or other internal power supplies. Leaf nodes 110a-110e are often more limited in their operations in order to help preserve the operational life of their power supplies.

The nodes 108a-108e and 110a-110e could also include other functionality, such as functionality for generating or using data communicated over the wireless network. For example, the leaf nodes 110a-110e could represent wireless sensors used to measure various characteristics within a particular site. The sensors could collect and communicate sensor readings to the controller 104 via the typically-present gateway infrastructure 112. The leaf nodes 110a-110e could also represent actuators that receive control signals from the controller 104. In this way, the leaf nodes may include or operate in a similar manner as the process elements 102 physically connected to the controller 104. The leaf nodes 110a-110e could further represent handheld user devices (such as INTELATRAC devices from HONEYWELL INTERNATIONAL INC.), mobile stations, programmable logic controllers, or any other or additional devices. The infrastructure nodes 108a-108e, 112 may also include any of the functionality of the leaf nodes 110a-110e or the controller 104.

The gateway infrastructure node 112 communicates wirelessly with, transmits data to, and receives data from one or more infrastructure nodes and possibly one or more leaf nodes. The gateway infrastructure node 112 may convert data between protocol(s) used by the network 106 and protocol(s) used by the nodes 108a-108e and 110a-110e. For example, the gateway infrastructure node 112 could convert Ethernet-formatted data transported over the network 106 into a wireless protocol format (such as an IEEE 802.11a, 802.11b, 802.11g, 802.11n, 802.15.3, 802.15.4, or 802.16 format) used by the nodes 108a-108e and 110a-110e. The gateway infrastructure node 112 could also convert data received from one or more of the nodes 108a-108e and 110a-110e into Ethernet-formatted data for transmission over the network 106. In addition, the gateway infrastructure node 112 could support various functions, such as network creation and security, used to create and maintain a wireless network. The gateway infrastructure node 112 includes any suitable structure for facilitating communication between components or networks using different protocols.

A wireless configuration and OLE for Process Control (OPC) server 114 can configure and control various aspects of the system 100. For example, the server 114 could configure the operation of the nodes 108a-108e, 110a-110e, and 112. The server 114 could also support security in the system 100, such as by distributing cryptographic keys or other security data to various components in the system 100 (like the nodes 108a-108e, 110a-110e, and 112). The server 114 includes any hardware, software, firmware, or combination thereof for configuring wireless networks and providing security information.

In particular embodiments, the various nodes in the wireless network of FIG. 1 form a mesh network communicating at 2.4 GHz or 5.8 GHz. A particular example of a wireless mesh network is the ONEWIRELESS network from HONEYWELL INTERNATIONAL INC. Also, in particular embodiments, data can be injected into the wireless mesh network through the infrastructure nodes or leaf nodes, thus providing versatile, multifunctional, site-wide coverage for wireless sensing, asset location tracking, personnel tracking, wireless communications, and any other or additional functionality as desired.

In accordance with this disclosure, one or more personnel carry and use one or more survey devices 116 to receive wireless signals from the infrastructure nodes 108a-108e (and possibly directly from the gateway infrastructure node 112). In particular embodiments, the survey devices 116 act as leaf nodes in the sense that they can communicate wirelessly with the infrastructure nodes 108a-108e (and possibly directly with the gateway infrastructure node 112) to receive wireless signals. As described in more detail below, the survey devices 116 enable personnel to identify the wireless coverage at specified sites and determine whether to install additional devices at those sites (such as additional infrastructure nodes to provide greater coverage and/or leaf nodes to use the existing or expanded coverage). Information could be presented to the personnel by the handheld device 116. The information could also be transmitted from the handheld device 116 to, for example, a control room or other location for presentation to appropriate personnel.

Although FIG. 1 illustrates one example of a wireless network system 100, various changes may be made to FIG. 1. For example, the system 100 could include any number of process elements, controllers, networks (wired or wireless), infrastructure nodes (gateway or other), leaf nodes, servers, and survey devices. Also, the functional division shown in FIG. 1 is for illustration only. Various components in FIG. 1 could be combined, subdivided, or omitted and additional components could be added according to particular needs. In addition, FIG. 1 illustrates one example operational environment in which the survey devices 116 could be used. This functionality could be used in any other suitable system.

Figure 2:
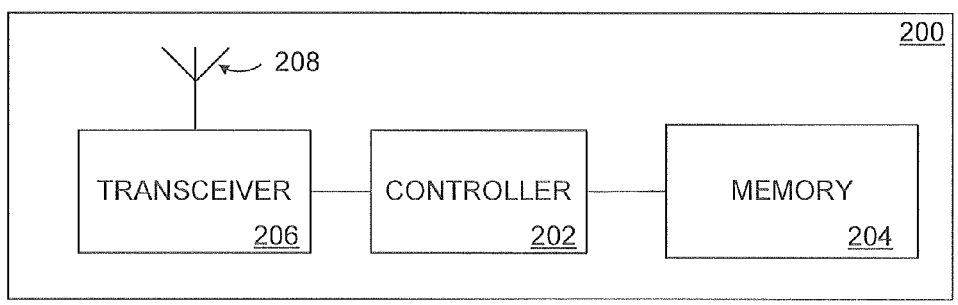
FIG. 2 illustrates an example wireless node in a wireless network according to this disclosure.

FIG. 2 illustrates an example wireless node 200 in a wireless network according to this disclosure. The wireless node 200 could, for example, represent a leaf node, infrastructure node, or gateway infrastructure node in the system 100 of FIG. 1. The embodiment of the wireless node 200 shown in FIG. 2 is for illustration only. Other embodiments of the wireless node 200 could be used without departing from the scope of this disclosure.

As shown here, the node 200 includes a controller 202, which controls the overall operation of the node 200. For example, the controller 202 may receive or generate data to be transmitted, and the controller 202 could provide the data to other component(s) in the node 200 for transmission over a wired or wireless network. The controller 202 could also receive data over a wired or wireless network and use or forward the data. As a particular example, the controller 202 in a sensor leaf node could provide sensor data for transmission, and the controller 202 in an actuator leaf node could receive and implement control signals (the leaf node could represent a combined sensor-actuator device). As another example, the controller 202 in an infrastructure node could receive data transmitted wirelessly, determine a next hop for the data (if any), and provide the data for transmission to the next hop (if any). As a third example, the controller 202 in a gateway infrastructure node 112 could receive data from a wired network and provide the data for wireless transmission (or vice versa). The controller 202 includes any hardware, software, firmware, or combination thereof for controlling operation of the node 200. As particular examples, the controller 202 could represent a processor, microprocessor, microcontroller, field programmable gate array, digital signal processor, or other processing or control device.

A memory 204 is coupled to the controller 202. The memory 204 stores any of a wide variety of information used, collected, or generated by the node 200. For example, the memory 204 could store information received over a network that is to be transmitted over the same or other network. The memory 204 includes any suitable volatile and/or non-volatile storage and retrieval device(s).

The node 200 also includes a wireless transceiver 206 coupled to an antenna 208. The transceiver 206 and antenna 208 can be used to communicate wirelessly with other devices. For example, in a leaf node, the transceiver 206 and antenna 208 can be used to communicate with infrastructure nodes. In an infrastructure or gateway infrastructure node, the transceiver 206 and antenna 208 can be used to communicate with leaf nodes, other infrastructure nodes, WiFi user devices, or other wireless devices. The transceiver 206 includes any suitable structure for transmitting and/or receiving wireless signals. In some embodiments, the transceiver 206 represents a radio frequency (RF) transceiver, such as an RF frequency hopping spread spectrum (FHSS) transceiver. Also, the antenna 208 could represent an RF antenna. It may be noted that any other suitable wireless signals could be used to communicate. In addition, the transceiver 206 could include a transmitter and a separate receiver.

Although FIG. 2 illustrates one example of a wireless node 200 in a wireless network, various changes may be made to FIG. 2. For example, various components in FIG. 2 could be combined, subdivided, or omitted and additional components could be added according to particular needs. As a particular example, a wired network interface could be used to facilitate communications over a wired network in gateway infrastructure nodes. Also, a "wireless node" represents any device that can transmit and/or receive data wirelessly, even if the "wireless node" has the ability to transmit and/or receive data over a wired connection as well.

As indicated earlier, whenever a business or other entity wants to deploy a new application or device at a particular site, a determination of the reliability of the network connection at the site is often necessary in order to determine if the network connection at the site is suitable for linking the new application or device to a network. Although a full-blown site survey could be used to measure the network connection at the site, a full-blown site survey is a costly and time-consuming process. While the time and expense may be justified when a large number of applications or devices are to be added at the site, it is difficult to justify the time and expense for the addition of one or a few applications or devices. Moreover, different applications or devices often require different levels of reliability depending on the criticality of the application or device (meaning the reliability requirement of an application or device is directly related to the application or device's criticality). Therefore, simply because the network connection at a site is suitable for an application or device that is currently deployed at the site does not necessarily mean that the network connection is suitable for deploying the new application or device.

Accordingly, this disclosure describes a survey device that provides a quick and convenient way of determining the reliability of a network connection at a particular site without having to incur the time and expense of a full-blown site survey. The survey device allows personnel to determine the reliability of a network connection at a particular site using a handheld device. Personnel or the survey device itself is then able to determine whether the existing network connection is suitable for a new application or device or whether the network connection will need to be enhanced, such as by the addition of more routers (like infrastructure nodes 108a-108e) to the site.

Figure 3:
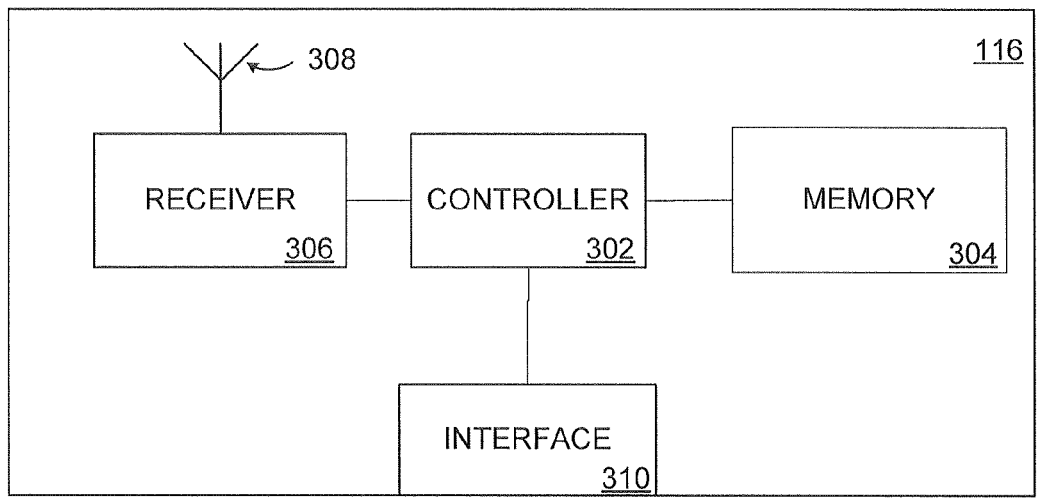
FIG. 3 illustrates an example survey device according to this disclosure.

FIG. 3 illustrates an example survey device 116 according to this disclosure. The embodiment of the survey device 116 shown in FIG. 3 is for illustration only. Other embodiments of the survey device 116 could be used without departing from the scope of this disclosure.

As shown here, the survey device 116 includes a controller 302, a memory 304, and a wireless receiver 306 coupled to an antenna 308. The receiver 306 and the antenna 308 are used to receive wireless signals, such as from the leaf nodes 110a-110e, the infrastructure nodes 108a-108e, or the gateway infrastructure node 112. The receiver 306 includes any suitable structure for receiving wireless signals. In some embodiments, the receiver 306 represents an RF receiver. Also, the antenna 308 could represent an RF antenna.

The controller 302 receives signals from the receiver 306 and controls the overall operation of the survey device 116. In some embodiments, the controller 302 determines one or more properties of a received wireless signal and correlates the properties of the wireless signal to one or more metrics related to reliability of the existing network connection. The metrics may include, for example, signal strength, bandwidth, latency, average number of frequency or other channels available, number of routing elements visible, and average latency through all routing paths. Using the one or more metrics, the controller 302 determines if the network connection at that particular site is suitable for a particular application or device that is to be deployed.

As indicated earlier, different applications or devices often require different levels of reliability depending on, for example, the criticality of the applications or devices. As a particular example, ISA100 is a wireless standard for industrial applications or devices and divides industrial applications or devices into the following classes:

Class 0: emergency action (which is always critical);
Class 1: closed loop regulatory control (which is often critical);
Class 2: closed loop supervisory control (which is usually non-critical);
Class 3: open loop control (which involves a person in the loop);
Class 4: flagging (which involves event-based maintenance); and
Class 5: logging and downloading/uploading (which does not have any immediate operational consequence).

Class 0 relates to safety. Classes 1 to 3 relate to control, and classes 4 and 5 relate to monitoring. The reliability requirement for the network connection increases from Class 5 to Class 0 as the criticality of the application or device increases. As one specific example, the reliability of a network connection can be viewed as a function of the connection quality (such as signal strength), redundancy (such as whether one sensor transmits messages to multiple paths), and the speed of the connection (such as bandwidth).

Accordingly, once the controller 302 receives a wireless signal and correlates one or more properties of the wireless signal to one or more metrics related to reliability, the controller 302 is able to determine whether the existing network connection at a site is reliable enough for a particular application or device. The controller 302 makes the determination by taking into account the one or more metrics, as well as the type of application or device involved.

The controller 302 includes any hardware, software, firmware, or combination thereof for controlling operation of the survey device 116. As particular examples, the controller 302 could represent a processor, microprocessor, microcontroller, field programmable gate array, digital signal processor, or other processing or control device.

A memory 304 is coupled to the controller 302. The memory 304 stores any of a wide variety of information used, collected, or generated by the survey device 116. For example, the memory 304 could store information regarding the different reliability requirements of different classes of applications or devices. The memory 304 also could store software for determining the properties of a wireless signal and correlating the properties of the wireless signal to the one or more metrics. The memory 304 includes any suitable volatile and/or non-volatile storage and retrieval device(s).

In this embodiment, an interface 310 is coupled to the controller 302. The interface 310 can be used to couple the survey device 116 to a handheld device having an input device and an output device. As a particular example, the handheld device could represent a personal digital assistant (PDA) having a keyboard and a liquid crystal display (LCD). The interface 310 may connect the survey device 116 to any port on the handheld device. For example, the interface 310 may connect the survey device 116 to a FIREWIRE port, a serial port, an IrDA port, or a BLUETOOTH port on the handheld device.

As an example, upon connection to the handheld device, the controller 302 could provide to the handheld device an indication of a class or classes of applications or devices that could be supported reliably by the existing network connection at that site. As another example, the controller 302 could allow a user of the handheld device to enter a class of the application or device that is to be deployed, and the controller 302 provides the user with an indication of whether the existing network connection reliably can support that particular class. As yet another example, the controller 302 could display the one or more metrics derived from the properties of the wireless signals at the site on a display of the handheld device and provide the user with the flexibility of making the determination based upon the one or more metrics.

Figure 4:
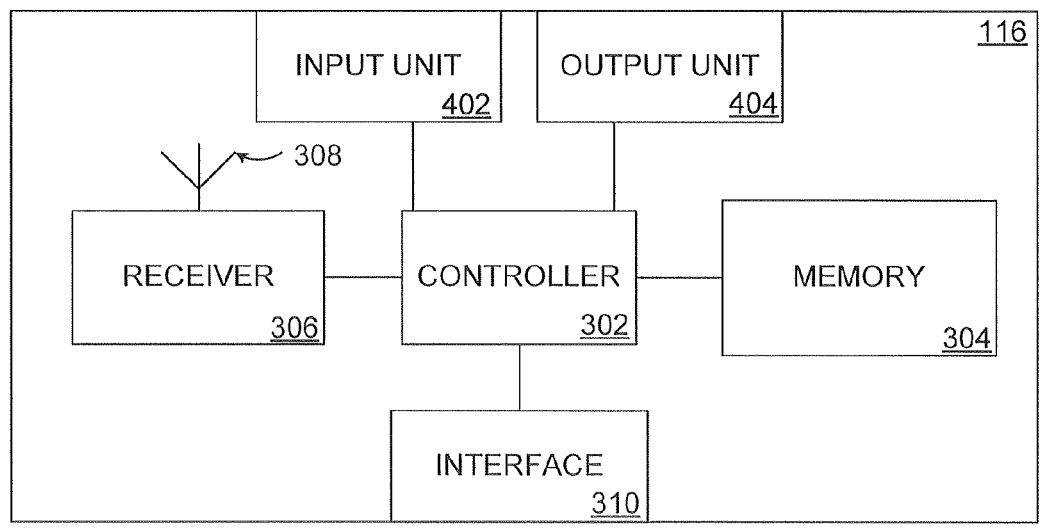
FIG. 4 illustrates another example survey device according to this disclosure.

Although FIG. 3 illustrates an embodiment in which the survey device 116 is attached to a handheld device, the survey device 116 may also be implemented as a stand-alone unit as shown in FIG. 4. The embodiment of the survey device 116 shown in FIG. 4 is for illustration only. Other embodiments of the survey device 116 could be used without departing from the scope of this disclosure.

In this embodiment, the survey device 116 also includes an input unit 402 and an output unit 404. As examples, the input unit 402 may be, for example, a numeric pad, an alphanumeric keypad, or a full QWERTY keyboard. Also, as an example, the output unit 404 may be an LCD. Among other things, the input unit 402 may allow a user to enter or select a class of application or device that is to be deployed. Among other things, the output unit 404 may display (i) a class or classes of applications or devices that could be supported reliably by the existing network connection or (ii) the one or more metrics derived from the properties of the wireless signals. In these embodiments, the interface 310 could be omitted.

In the case of a touch screen, the touch screen could incorporate both the input unit 402 and the output unit 404. Also, the survey device 116 can be implemented to display information (such as a class or classes of applications or devices that could be supported reliably by the existing network connection and/or the one or more metrics) without input from the user. In these embodiments, the input unit 402 could be omitted.

Although FIGS. 3 and 4 illustrate two examples of a survey device 116, various changes may be made to FIGS. 3 and 4. For example, various components in FIGS. 3 and 4 could be combined, subdivided, or omitted and additional components could be added according to particular needs.

Figure 5:
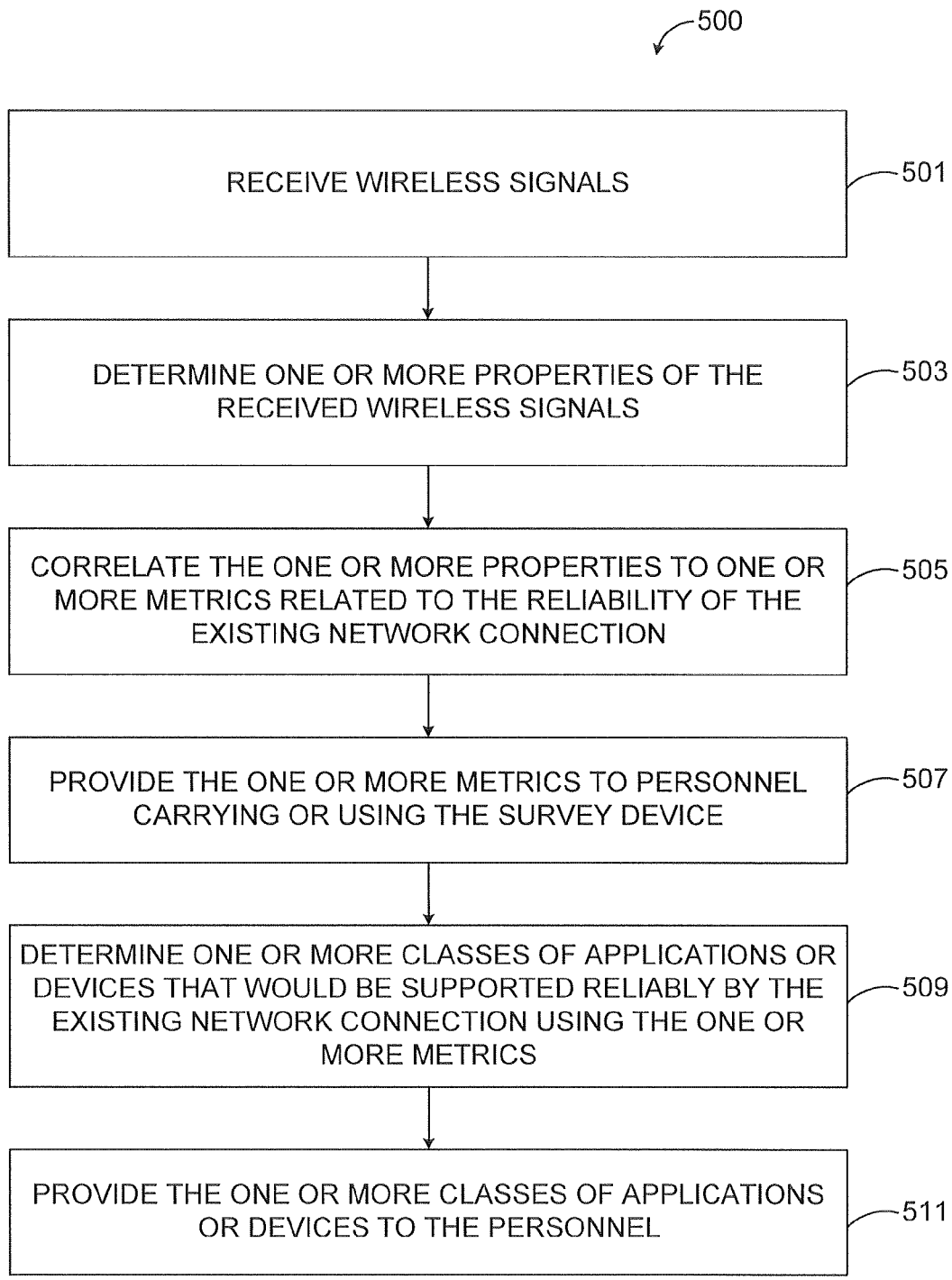
FIG. 5 illustrates an example method for determining the reliability of a network connection at a particular site according to this disclosure.

FIG. 5 illustrates an example method 500 for determining the reliability of a network connection at a particular site according to this disclosure. One or more personnel carry and use survey device 116 (either attached to a handheld device or as a stand-alone unit) to receive wireless signals at a site (step 501). The survey device 116 determines one or more properties of the received wireless signals (step 503). The survey device 116 correlates the one or more determined properties of the wireless signals to one or more metrics related to the reliability of the existing network connection (step 505). The survey device 116 provides the one or more metrics to the personnel carrying and using the survey device 116 (step 507). The survey device 116 uses the one or more metrics to determine a class or classes of applications or devices that could be supported reliably by the existing network connection (step 509). For example, the instantaneous value(s) of one or more metrics could be used, or the values of a metric can be averaged over time and a decision taken based on one or more statistical characteristics of the average. The survey device 116 provides the identified class or classes of applications or devices to the personnel carrying and using the survey device 116 (step 511). At this point, any suitable action(s) can take place, such as deploying one or more applications or devices at the site that are supported reliably by the existing network connection at the site.

Figure 6:
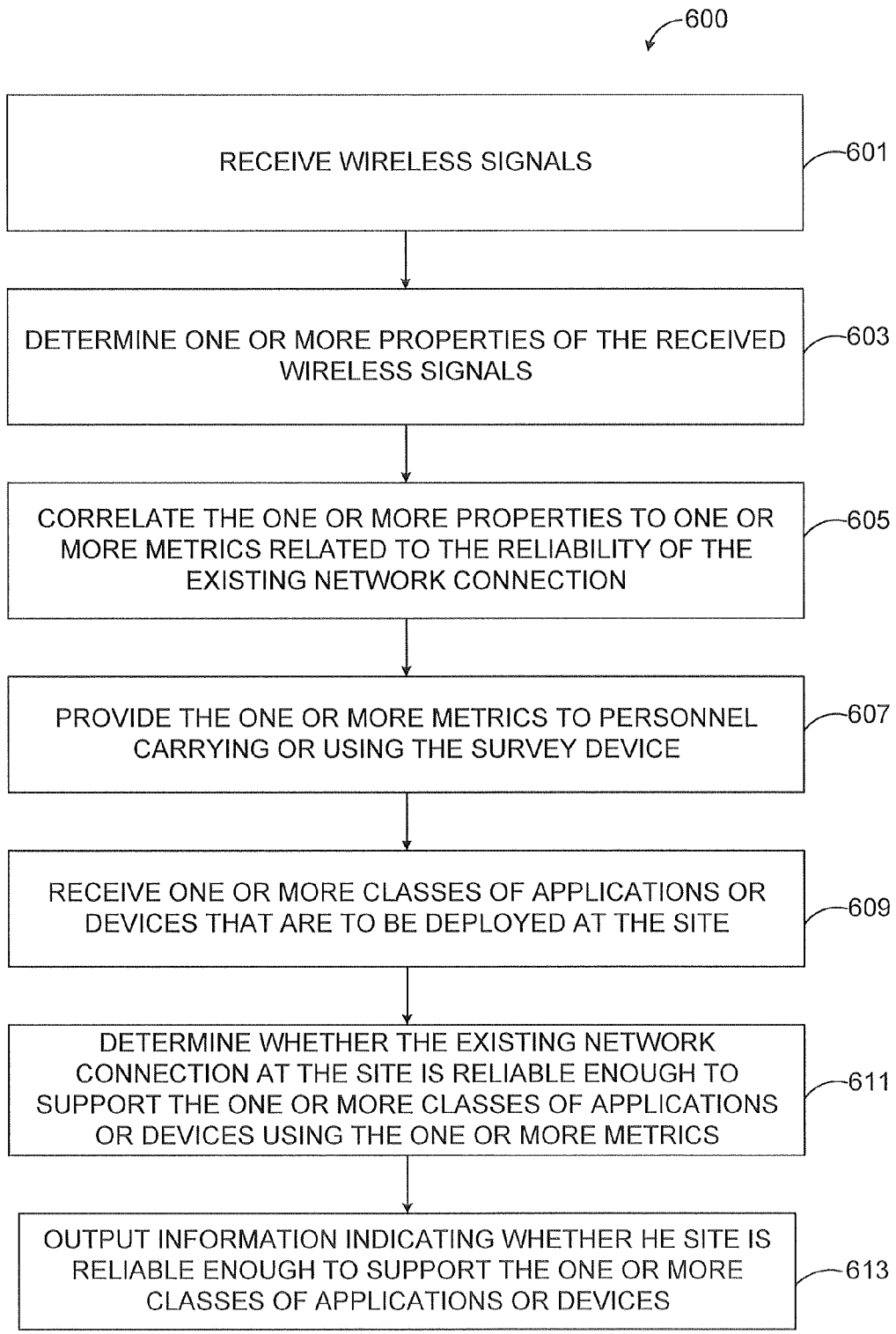
FIG. 6 illustrates another example method for determining the reliability of a network connection at a particular site according to this disclosure.

FIG. 6 illustrates another example method 600 for determining the reliability of a network connection at a particular site according to this disclosure. In this embodiment, one or more personnel carry and use survey device 116 (either attached to a handheld device or as a stand-alone unit) to receive wireless signals at a site (step 601). The survey device 116 determines one or more properties of the received wireless signals (step 603). The survey device 116 correlates the one or more properties of the wireless signals to one or more metrics related to the reliability of the existing network connection (step 605). The survey device 116 provides the one or more metrics to the personnel carrying and using the survey device 116 (step 607). The survey device 116 receives a class or classes of applications or devices that are to be deployed at the site from the personnel carrying and using the survey device 116 (step 609). The survey device 116 uses the one or more metrics to determine whether the existing network connection at the site is reliable enough to support the received class or classes of applications or devices (step 611). For example, the instantaneous value(s) of one or more metrics could be used, or the values of a metric can be averaged over time and a decision taken based on one or more statistical characteristics of the average. The survey device 116 provides information indicating whether the existing network connection at the site is reliable enough to support the received class or classes of applications or devices (step 613). At this point, any suitable action(s) can take place, such as deploying one or more applications or devices at the site that are supported reliably by the existing network connection at the site.

Although FIGS. 5 and 6 illustrate examples of methods for determining the reliability of a network connection at a particular site, various changes may be made to FIGS. 5 and 6. For example, while shown as a series of steps, various steps in FIGS. 5 and 6 could overlap, occur in parallel, occur in a different order, or occur multiple times. Further, note that these steps could occur at any suitable time(s), such as in response to a command from a user or from an external device or system.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship with or to, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving wireless signals from a wireless network at a handheld device located at a specified site, the wireless signals associated with a network connection at the specified site;
determining one or more metrics related to a reliability of the network connection at the specified site; and
determining, prior to deployment, that at least one class of applications or devices is supported by the network connection using (i) the one or more metrics and (ii) a level of reliability of the network connection assigned to a criticality of the at least one class of applications or devices;
wherein the at least one class of applications or devices is at least one class in a hierarchy of classes, the hierarchy of classes defined by an industrial automation standard for wireless systems; and
wherein a hierarchical level of each class of applications or devices corresponds to a different level of reliability of the network connection.

2. The method of claim 1, further comprising:
displaying at least one of: the one or more metrics and information indicating that the at least one class of applications or devices is supported by the network connection.

3. The method of claim 1, wherein the one or more metrics comprise at least one of: a signal strength, a bandwidth, a latency of the network connection at the specified site, an average number of channels available at the specified site, a number of routing elements visible at the specified site, and an average latency through all routing paths at the specified site.

4. The method of claim 3, wherein determining that the at least one class of applications or devices is supported by the network connection comprises determining that each of the one or more metrics is suitable for the at least one class of applications or devices based on the criticality of the at least one class of applications or devices.

5. The method of claim 1, wherein determining the one or more metrics comprises:
determining one or more properties of the received wireless signals at the specified site; and
correlating the one or more properties of the received wireless signals to the one or more metrics.

6. The method of claim 1, wherein the handheld device is coupled to an external device that at least one of determines the one or more metrics and determines that the at least one class of applications or devices is supported by the network connection.

7. The method of claim 1, wherein the handheld device determines the one or more metrics and determines that the at least one class of applications or devices is supported by the network connection.

8. A handheld device comprising:
a receiver configured to receive wireless signals at a specified site from a wireless network, the wireless signals associated with a network connection at the specified site;
a controller configured to determine one or more metrics related to a reliability of the network connection at the specified site and to determine, prior to deployment, that at least one class of applications or devices is supported by the network connection using (i) the one or more metrics and (ii) a level of reliability of the network connection assigned to a criticality of the at least one class of applications or devices; and
a display configured to present information indicating that the at least one class of applications or devices is supported by the network connection at the specified site;
wherein the at least one class of applications or devices is at least one class in a hierarchy of classes, the hierarchy of classes defined by an industrial automation standard for wireless systems; and
wherein a hierarchical level of each class of applications or devices corresponds to a different level of reliability of the network connection.

9. The handheld device of claim 8, wherein the one or more metrics comprise at least one of: a signal strength, a bandwidth, a latency of the network connection at the specified site, an average number of channels available at the specified site, a number of routing elements visible at the specified site, and an average latency through all routing paths at the specified site.

10. The handheld device of claim 9, wherein the controller is configured to determine that each of the one or more metrics is suitable for the at least one class of applications or devices based on the criticality of the at least one class of applications or devices.

11. The handheld device of claim 10, wherein the controller is further configured to determine that at least one of the one or more metrics is not suitable for a second class of applications or devices based on a criticality of the second class of applications or devices.

12. The handheld device of claim 8, wherein the controller is configured to determine the one or more metrics by:
determining one or more properties of the received wireless signals at the specified site; and
correlating the one or more properties of the received wireless signals to the one or more metrics.

13. The handheld device of claim 8, wherein:
the controller is further configured to receive a selection of the at least one class of applications or devices from a user; and
the controller is configured to determine that the at least one class of applications or devices is supported by the network connection in response to the selection of the at least one class of applications or devices.

14. A handheld device comprising:
a receiver configured to receive wireless signals at a specified site from a wireless network, the wireless signals associated with a network connection at the specified site;
a controller configured to determine one or more metrics related to a reliability of the network connection at the specified site;
an interface configured to provide the one or more metrics to an external device and to receive an indication that prior to deployment, at least one class of applications or devices is supported by the network connection from the external device, wherein the indication is based on (i) the one or more metrics and (ii) a level of reliability of the network connection assigned to a criticality of the at least one class of applications or devices; and
a display configured to present information indicating that the at least one class of applications or devices is supported by the network connection at the specified site;
wherein the at least one class of applications or devices is at least one class in a hierarchy of classes, the hierarchy of classes defined by an industrial automation standard for wireless systems, and
wherein a hierarchical level of each class of applications or devices corresponds to a different level of reliability of the network connection.

15. The handheld device of claim 14, wherein the one or more metrics comprise at least one of: a signal strength, a bandwidth, a latency of the network connection at the specified site, an average number of channels available at the specified site, a number of routing elements visible at the specified site, and an average latency through all routing paths at the specified site.

16. The handheld device of claim 15, wherein the external device is configured to determine that each of the one or more metrics is suitable for the at least one class of applications or devices based on the criticality of the at least one class of applications or devices.

17. The apparatus of claim 16, wherein:
the external device is further configured to determine that at least one of the one or more metrics is not suitable for a second class of applications or devices based on a criticality of the second class of applications or devices; and
the display is configured to present information indicating that the second class of applications or devices is not supported by the network connection at the specified site.

18. The handheld device of claim 11, wherein the controller is configured to determine the one or more metrics by:
determining one or more properties of the received wireless signals at the specified site; and
correlating the one or more properties of the received wireless signals to the one or more metrics.

19. The handheld device of claim 14, wherein:
one of the controller and the external device is further configured to receive a selection of the at least one class of applications or devices from a user; and
the controller is configured to determine the one or more metrics in response to the selection of the at least one class of applications or devices.

20. The handheld device of claim 14, wherein the interface comprises a wireless interface.

21. The method of claim 1, wherein determining that the at least one class of applications or devices is supported by the network connection at the specified site further comprises:
determining that the reliability of the network connection at the specified site is suitable for a new device to be added at the specified site, the new device not currently deployed at the specified site.

22. The method of claim 1, wherein the criticality of the at least one class of applications or devices comprises a relationship to at least one of:
a safety issue at the specified site;
control at the specified site; and
monitoring of the specified site.

23. The method of claim 1, wherein determining that the at least one class of applications or devices is supported by the network connection at the specified site further comprises:

determining that the reliability of the network connection at the specified site is suitable for a new application, the specified site not currently configured to deploy the new application.

* * * * *